United States Patent [19]
Hill

[11] 3,756,460
[45] Sept. 4, 1973

[54] METERED LIQUID DISPENSING DEVICE
[75] Inventor: John A. Hill, New Brunswick, N.J.
[73] Assignee: E. R. Squibb & Sons, Inc., Princeton, N.J.
[22] Filed: Sept. 25, 1972
[21] Appl. No.: 292,236

[52] U.S. Cl.................... 222/1, 222/212, 222/213, 222/386
[51] Int. Cl............................................. B63d 37/00
[58] Field of Search...................... 222/1, 200, 206, 222/207, 211, 212, 213, 215, 386, 387, 444, 448, 449, 450, 454, 456, 491, 492, 495, 500, 501, 566, 567, 568, 569, 570

[56] References Cited
UNITED STATES PATENTS
3,146,919  9/1964  Chappell............................ 222/212
3,567,079  3/1971  Weigand............................ 222/213

Primary Examiner—Robert B. Reeves
Assistant Examiner—Larry Martin
Attorney—Lawrence S. Levinson et al.

[57] ABSTRACT

A metered liquid dispensing device having a flexible hollow body with a narrowed unit volume chamber and a larger chamber which is connected to a fluid reservoir. A pair of spheres, one acting as a piston element and the other as a drive member are disposed in the body, with the piston element in abutting relation with the beginning of the narrowed section and the drive member directly behind and abutting the piston element. By finger manipulation of the flexible body, the drive member pushes the piston element through the unit volume chamber which element forces the fluid therein through a discharge member in the body.

10 Claims, 3 Drawing Figures

METERED LIQUID DISPENSING DEVICE

BACKGROUND OF THE INVENTION

The present invention relates to a metered fluid dispensing device for use in dispensing precise volumes of fluid from a bottle or container. This device is useful for the dispensation of fluids of high or low viscosity as well as transparent or opaque fluids.

The dispensation of rather accurate and small quantities of fluid has been quite difficult with prior and present art devices. This task has traditionally been quite messy and it has always been difficult to precisely obtain the desired volume, particularly when dealing with quantities of 2 ml. or less. In particular, in the laboratory certain fluids are required in precise small quantities many times. The chemist or technician will therefore spend considerable time and energy metering small quantities of fluids. The present invention permits the accurate dispensation of small quantities of fluid quite simply and frees the chemist for more productive tasks.

In none of the prior art devices is the objective of the metering of a precise amount of fluid accomplished so simply as in the present invention. No measuring and no guessing is necessary when the instant invention is employed. When a predetermined amount of fluid is desired, the bottle is merely tilted and the device finger manipulated. The correct amount of fluid is dispensed every time.

SUMMARY OF THE INVENTION

A primary object of the present invention is the provision of a device which assures the accurate dispensation of small quantities of fluid by a simple and dependable procedure.

Yet another object of the present invention is the provision of a fluid dispensing device which is inexpensive to manufacture and is characterized by an economy of moving parts.

In accordance with the above designs, a generally hollow body of semi-rigid resilient material is formed having a narrowed section known as a unit volume chamber. The body also has an expanded chamber which is suitably attached to a bottle or container top, and which body also has a discharge member at the end of the unit volume chamber. Two spheres, one known as a piston element, and the other as a drive member, normally are housed in the expanded section and have diameters slightly greater than the diameter of the unit volume chamber.

To dispense fluid from the bottle or container, one merely tips the bottle so as to fill the resilient body with fluid, then the body is manually manipulated, such as by a kneading action, to push the drive member toward the unit volume chamber. The drive member in turn urges the piston element into the unit volume chamber, which element forces the fluid through the discharge member. The usage of the drive member insures that all the fluid in the unit volume chamber is dispensed inasmuch as the "out-of-round" deformation that occurs when the body is squeezed would normally occur adjacent to the piston element, but in this case occurs adjacent to the drive member.

The above and other objects of the instant invention will be apparent from the following description when read in conjunction with the drawing.

DETAILED DESCRIPTION

Figure 1:
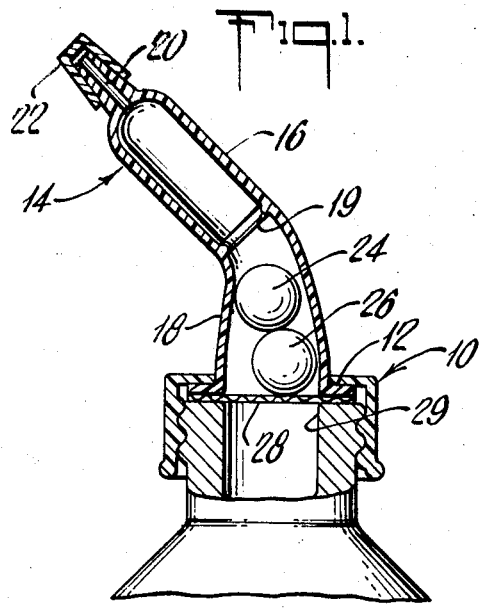
FIG. 1, illustrates a cross-sectional view of the metering device, prior to manipulation, but with the piston element poised to push the fluid out of the body.

Referring to FIG. 1, the liquid dispensing device is shown prior to the dispensation of the fluid therein. The device is shown attached to a bottle cap 10 which is itself attached to a bottle or container. The connection between the metering device and the bottle can be of any suitable nature; the one here shown includes circular flange 12 which abuts the underside of the bottle cap 10. It is of course important that there be no leakage of fluid between the device and bottle cap 10.

The body of the metering device is denoted by numeral 14 and is formed of semi-rigid, resilient material which tends to return to its original shape upon deformation. Some acceptable materials of manufacture for the body are polyvinyl chloride, polypropylene, polyethylene or modified polymers etc. The body 14 is characterized as being substantially hollow to contain fluid. Additional characteristics of primary importance are denoted by the numerals 16 and 18. A precise unit volume chamber shown as a narrowed section is denoted by numeral 16, and an expanded chamber is denoted by numeral 18. The unit volume chamber 16 is set-off from the expanded chamber 18 by the slight internal rib 19. The unit volume chamber tapers at its outer end and a discharge member 20 which passes the fluids is located at the tip of the body 14. The cover cap 22 is fastened to the discharge member 20 until such time as the fluid is to be discharged. In the embodiment here illustrated, the unit volume chamber 16 is disposed at an angle to the expanded chamber 18; however there is no restriction to such a disposition, and the two chambers may even be linearly aligned.

Shown within the body 14 and abutting the rib 19 is the sphere 24 hereinafter referred to as the piston element. Directly behind the piston element is an identical sphere 26 which shall be called the drive member. While the two spheres 24, 26 need not be identical, and in fact, need not be perfect spheres, it has been found that such a configuration best suits the needs of the instant invention. Additionally, materials such as nylon, glass, steel, and teflon are non-exclusive examples of the substances which are well suited for the piston element 24 and drive member 26.

Of great importance to the instant invention is the relative diameters of the piston element 24 and drive member 26 with respect to the unit volume chamber 16 diameter. For effective operation of the device, the diameter of the piston element 24 and drive member 26 should be slightly larger than the diameter of th unit volume chamber. In practice it has been found that one sixty-fourth inch is sufficient, but the actual excess may vary somewhat depending upon the specific materials used and the specific fluid being dispensed.

In practice it is permissible for the piston element 24 and drive member 26 to reside in the bottle prior to the actual dispensation of fluid. Alternatively, a perforated plate 28 may be suspended across the mouth 29 of the bottle which plate permits the passage of fluid therethrough, and also traps the piston element 24 and drive member 26 within the expanded chamber 18 during periods of non-use.

To dispense fluid from the bottle, the bottle must be tilted so that fluid completely fills the unit volume chamber 16. The body 14 is then gripped just behind the drive member 26 and manipulated, or kneaded, such that the drive member 26 is driven up into the unit volume chamber 16. It follows, that the piston element 24 is likewise driven up into the unit volume chamber 16. As the diameter of both the element 24 and member 26 are greater than the diameter of the unit volume chamber 16, it follows that the body 14 should be preferably fabricated from an elastic material to insure reliable repetitive operations.

Figure 2:
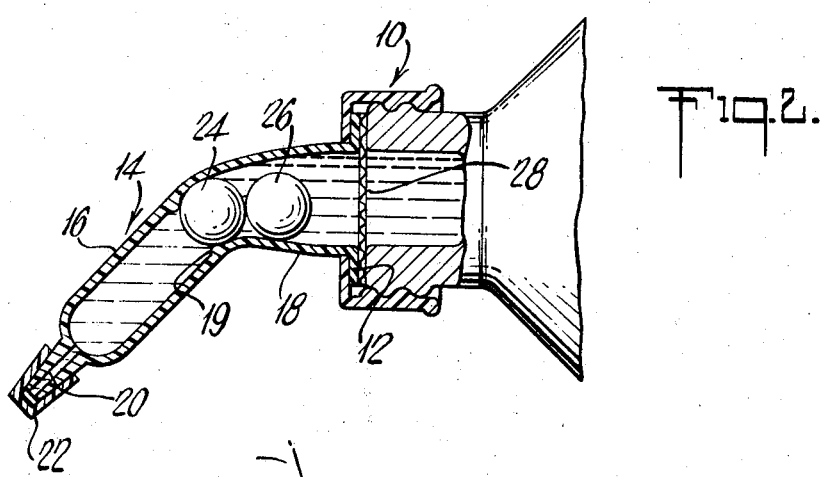
FIG. 2, shows the metering device in cross-section before the manipulation of the body.
Figure 3:
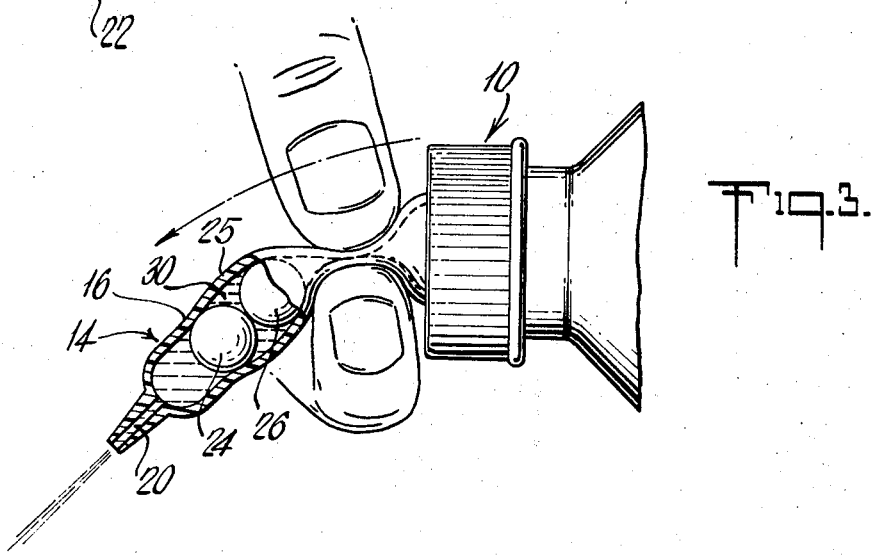
FIG. 3, shows the metering device in cross-section after manipulation of the body.

With the cover cap 22 removed, as the piston member 24 moves up the unit volume chamber 16, the fluid is forced through the discharge member 20. Referring to FIG. 2 it is seen that as the piston element 24 spreads the unit volume chamber 16, there is an "out-of-round" deformation 25 formed adjacent the drive member 26. That deformation 25 is formed by the pinching of the unit volume chamber 16 just behind the drive member 26. It should be noted that although there is deformation adjacent the drive member 26, the piston element 24 remains in complete contact with the walls of the unit volume chamber 16. Thus, there is no reverse flow from that chamber into the expanded chamber and all the fluid initially contained therewithin is discharged. The pocket 30 of fluid trapped between the element 24 and member 26 results from fluid passing through the deformation 25 from the expanded chamber. That pocket 30 of fluid remains trapped throughout the entire manipulation of the body 14 but in no manner affects the quantity of fluid being discharged.

The above described manipulations can be repeated as often as desired with the proper quantity of fluid dispensed each and every time. The manipulations are simple and quick, and the device is of very simple and inexpensive construction.

This invention may be embodied in several forms without departing from the spirit or essential characteristics of the claims. All changes that fall within the metes and bounds of the claims are intended to be embraced therewithin.

What is claimed is:

1. A metered fluid dispensing device comprising a semi-rigid, resilient, generally hollow body filled with fluid, said body adapted at one end to engage a reservoir member that is to be discharged, the other end of said body having a discharge member for the dispensation of the fluid, said body also comprising a narrowed section of predetermined volume, a piston element in said body of a diameter slightly greater than the relaxed diameter of said narrowed section, a drive member in abutting relation to said piston element and disposed between said reservoir and said piston element, said drive member adapted to be manually manipulated via the manual manipulation of said body, to drive said piston element, through the length of said narrowed section toward said discharge member, thereby forcing the fluid contents of said narrowed section through said discharge member.

2. The device of claim 1 wherein the diameter of said drive member is slightly greater than the diameter of said narrowed section.

3. The device of claim 1 wherein said piston element is a sphere.

4. The device of claim 1 wherein said piston element is a sphere.

5. The device of claim 1 wherein drive member is a sphere.

6. The device of claim 1 wherein said piston element and said drive member are of equal diameter.

7. The device of claim 1 in which said body is fabricated from a transparent material to permit visual observation of the dispensation of the fluid.

8. In claim 1, a perforated plate connected to said body between said reservoir and said narrowed section said plate confining said piston element and said drive member within said body and permitting the passage of fluid therethrough into said body.

9. In claim 1, an internal rib on said body defining the beginning of said narrowed section.

10. A method of dispensing metered fluid comprising taking a fluid metering device, said device comprising a semirigid, resilient, generally hollow body said body adapted at one end to engage a reservoir member that is to be discharged, the other end of said body having a discharge member for the dispensation of the fluid, said body also comprising a narrowed section of predetermined volume, a piston element in said body of a diameter slightly greater than the relaxed diameter of said narrowed section, a drive member in abutting relation to said piston element and disposed between said reservoir and said piston element, said drive member manually manipulable, via the manual manipulation of said flexible body, through the length of said narrowed section, tilting said reservoir so as to fill said body with fluid, and said piston element contacting said narrowed section, and manipulating said body so as to force said drive member to push said piston element through said narrowed section to discharge the fluid through said discharge member.

* * * * *